Aug. 26, 1947.　　　C. D. DAVIDSON　　　2,426,488
DUAL MOTOR CONTROL
Filed Aug. 30, 1944　　　2 Sheets-Sheet 1
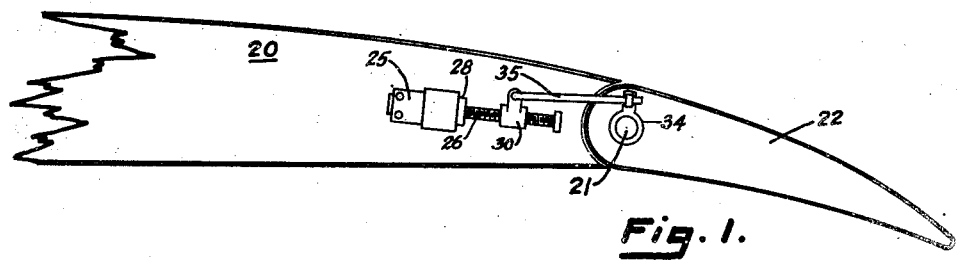
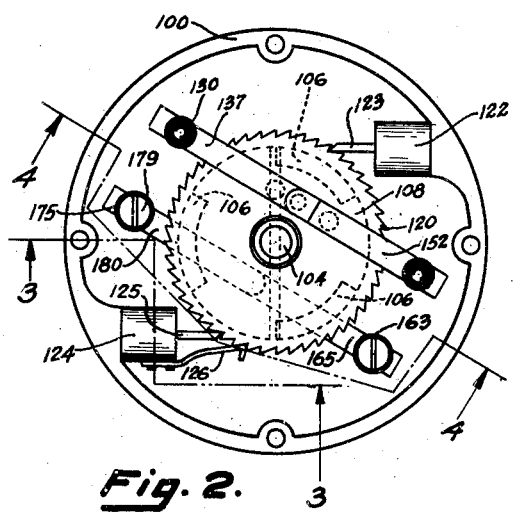
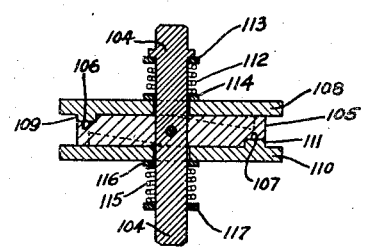
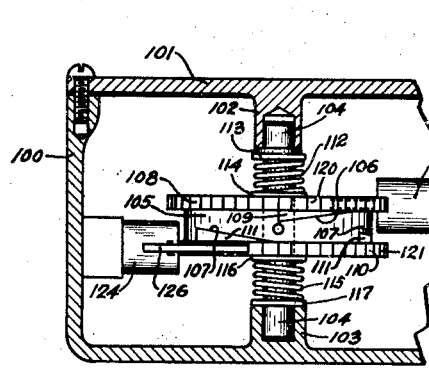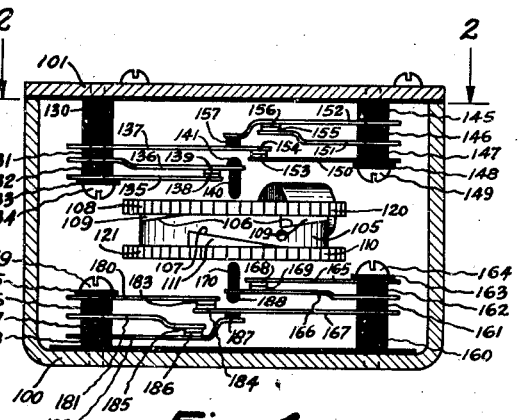
INVENTOR
CHARLES D. DAVIDSON
BY
HIS　Spencer, Hardman & Fehr
ATTORNEYS Patented Aug. 26, 1947

2,426,488

UNITED STATES PATENT OFFICE 2,426,488

DUAL MOTOR CONTROL

Charles D. Davidson, Dayton, Ohio, assignor to General Motors Corporation, Detroit, Mich., a corporation of Delaware Application August 30, 1944, Serial No. 551,964

16 Claims. (Cl. 172—293)

1

This invention relates to an improved control device for a pair of electric motors adapted to operate concurrently.

It is among the objects of the present invention to maintain concurrently operating electric motors in substantial synchronism.

Another object of the present invention is to provide a control device adapted to maintain the operation of a pair of electric motors in substantial synchronism, said device being further adapted to stop the operation of both motors when either one of the electric motors predeterminately run ahead of the other electric motor.

Further objects and advantages of the present invention will be apparent from the following description, reference being had to the accompanying drawings wherein a preferred embodiment of the invention is clearly shown.

All of the objects of the present invention are accomplished by providing a synchronizer control device for a pair of concurrently operating electric motors, said device comprising a rotatable member for each electric motor, each member being rotatable in accordance with the speed of a respective motor. As long as both of these members rotate in substantial synchronism, indicating that both electric motors are also operating in synchronism, the synchronizer merely operates idly. However, if one of said members rotates ahead of the other, this member is adapted to render a speed retarding means effective to reduce the operating speed of its respective motor for purposes of equalizing the speed of both motors. If, for some reason, one of the electric motors persists in running ahead or lagging behind the other, so that the motor speed controlling means, rendered effective by the synchronizer, cannot provide for synchronized motor operation, then the synchronizer is adapted to effect the breaking of all of the motor circuits and stop the operation of both motors.

In the drawings:

Fig. 1 is a fragmentary view of an airplane wing and its wing flap with the present invention applied thereto.

Fig. 2 is a view into the cup-shaped container of one form of synchronizer. This view is taken in the direction of the arrows 2—2 of Fig. 4.

Fig. 3 is a fragmentary sectional view taken along the line 3—3 of Fig. 2. In this view the switches have been eliminated to permit a clearer showing of the rotating portions of the synchronizer.

Fig. 4 is a sectional view taken along the line and in the direction of the arrows 4—4.

2

Figure 6:
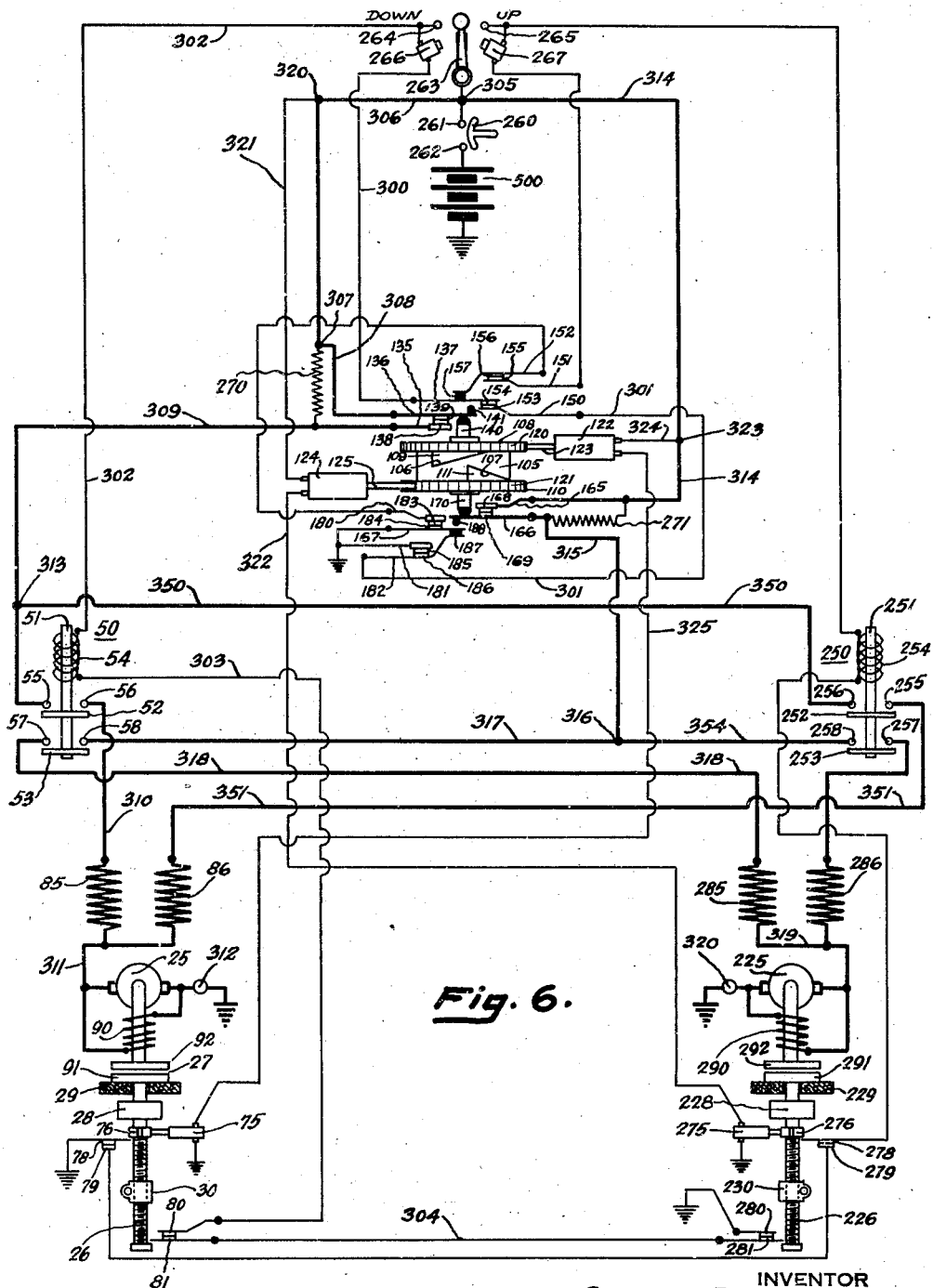

Fig. 5 is a detailed sectional view of the rotating parts of the synchronizer.

Fig. 6 is a wiring diagram illustrating the two electric motors, the synchronizer and various electrical devices and their electrical connections comprising the control device of the present invention.

The device of the present invention may be used in connection with any mechanism or machine having parts to be concurrently operated such as truck gates, engine louvres, wing flaps or ailerons, airplane landing gears, etc. For the present purpose the invention is shown applied to an airplane for operating the wing flaps or ailerons. Each wing of an airplane is provided with a hinged flap operated during flying or to provide speed retarding means for the airplane during landing. To maintain proper balance it is essential that both wing flaps be actuated in unison.

The Fig. 1 of the drawings illustrates a portion of one airplane wing in which a motor driven actuator is provided to operate the flap. The main wing portion is indicated by the numeral 20 and carries a pivot rod 21 to which the wing flap 22 is hingedly secured.

The motor driven actuator of the present invention is similar in construction to the one forming the subject matter of the copending application Serial No. 468,475, filed by Calvin J. Werner and comprises a reversible electric motor 25 adapted to drive a screw shaft 26 through an electromagnet 27 and speed reducing gearing 28. The electromagnet clutch normally disconnects the motor 25 from the screw shaft 26. Normally the screw shaft is held against rotation by engagement with the movable part of the clutch with a brake ring 29. When the motor is energized the electromagnet is simultaneously energized causing the movable part of the electromagnet to be withdrawn from engagement with the brake ring 29 and moved into driving engagement with the engine driven member 92 of the clutch.

The screw shaft 26 is provided with a traveling nut 30 adapted to move from one to the other end of the shaft in response to rotation of said shaft. As the screw shaft 26 is rotated in one direction, the nut 30 thereon will move outwardly toward the free end of the shaft and as said screw shaft rotates in the opposite direction the nut will move inwardly toward the motor.

In Fig. 1 the actuator comprising the motor 25 and screw shaft 26 is rigidly mounted in the wing 20. As has been mentioned before, the wing has a rod 21 upon which the wing flap 22 is hingedly supported. A clevis 34 is secured to the flap 22. One end of an operating rod 35 is anchored to the clevis, the other end of said lever being attached to the traveling nut 30. When, as shown in Fig. 1, the nut is in position substantially midway of the screw shaft 26, the flap 22 is held in proper aligned or neutral position relatively to the wing 20. However, when the motor rotation causes the nut 30 to move inwardly toward the motor 25, then the connection between the nut and wing flap clevis 34 will move the flap 22 upwardly from the rod 21. Reverse rotation of the electric motor causes the nut to move downwardly, resulting in a downward movement of the wing flap 22.

In the installation as illustrated, it is essential that both wing flaps be actuated in unison, for if one wing flap would be operated to a greater degree than the other, the plane would be thrown into an unbalanced condition, which is particularly undesirable during landing, at which time the flaps are used to retard plane speed.

Any suitable type of synchronizer may be utilized, however, for purposes of this description, one form is presented comprising a housing 100 having a lid 101. Particular reference is being had to the Figs. 2 to 5 inclusive. The lid and housing each have an inwardly extending lug 102 and 103 respectively, one aligning with the other and each being recessed to receive the respective ends of a shaft 104 whereby said shaft is rotatably supported within the housing between the bottom end wall thereof and the lid 101. Keyed to this shaft 104 so as to be substantially in the center of the housing is a cam disc 105. On each side of said cam disc are provided a plurality of narrow elongated recesses each conforming to the periphery of the cam disc, all equally spaced one from the other. Their bottom wall surfaces taper from a predetermined depth at their clockwise ends (Fig. 2) toward the surface of the cam disc, blending therewith at their counterclockwise ends. The recesses in the upper surface of the cam disc 105 are designated by the numeral 106 and those in the bottom surface of the cam disc by the numeral 107.

A rotatable disc, centrally apertured loosely to fit about the shaft 104, rests upon each side of the cam disc 105. The rotatable disc 108 rests upon the upper surface of the cam disc. This disc 108 has tapering, depending extensions 109 conforming in shape and size to the recesses 106 in the engaged surface of the cam disc. Each tapering extension normally occupies a recess in the adjacent surface of the cam disc. A similar rotatable disc 110 loosely fits about shaft 104 and engages the bottom surface of the cam disc 105. Like disc 108, this disc 110 has tapering extending portions 111 each occupying a corresponding recess in the engaged surface of the cam disc 105.

Disc 108 is yieldably urged upon the upper surface of the cam disc 105 by a coil spring 112 surrounding shaft 104 and interposed between two loose washers 113 and 114, the former engaging an annular flange on the shaft, the latter resting upon the upper surface of the rotatable disc 108. A similar spring 115 urges the rotatable disc 110 upon the lower surface of the cam disc 105, this spring 115 being interposed between two loose washers 116 and 117, the former resting against the rotatable disc 110, the latter resting upon the inner end surface of the lug 103 of housing 100 when the mechanism is assembled.

Each disc 108 and 110 is provided with ratchet teeth in its outer peripheral edge, the teeth of disc 108 being designated by the numeral 120, the teeth of disc 110 being indicated by the numeral 121. The discs 108 and 110 are rotated by electromagnet impulsers. Disc 108 is actuated by impulser 122 having a reciprocative dog 123 normally held in its retracted position, but when said impulser is electromagnetically energized, dog 123 is thrust outwardly to exert a pushing effort upon the ratchet 120 of disc 108 whereby to rotate said disc 108 counterclockwise the distance of one ratchet tooth (see Fig. 2). Impulser 124 has a reciprocative dog 125 adapted to engage the teeth 121 of the disc 110 so that when said impulser is energized this disc 110 is moved counterclockwise through the distance of one tooth by the movement of the dog 125 of the energized impulser 124. Deenergization of either impulser 122 or 124 permits automatic return of their respective dogs 123 and 125 to normal position in which each will seat in its next adjacent respective ratchet teeth of the respective disc 108 or 110. A spring lock dog 126 is supported within the housing engaging the ratchet teeth of disc 110 and provides means to prevent backward rotation of either disc 108 and 110 and also adding a spring-loaded drag to the forward movement of the disc 110.

As long as discs 108 and 110 are moving in unison there will be no relative movement between them and the cam disc 105 for their synchronized turning will cause the cam disc 105 and its shaft 104 to turn therewith. However, if disc 108 is rotated faster than disc 110, its tapered extensions will be moved ahead of the rotation of the cam 105 and will consequently cause them to ride upwardly on the upwardly sloping bottom surfaces of the respective recesses in which said extensions rest. Relative movement between the tapering surfaces of the cam recesses and the occupying disc extensions cause the disc 108 to move longitudinally of the shaft 104 against the effect of spring 112 whereby the disc 108 will move upwardly in the housing toward the lid 101. Similarly when and if rotating disc 110 turns faster than disc 108, a relative movement between disc 110 and cam disc 105 obtains and the engaging sloping surfaces of the extending portions on disc 110 and their respective recesses in cam 105 will cause a movement of the disc 110 longitudinally of the shaft 104 away from the camming element 105 and toward the bottom of the synchronizer housing 100.

The synchronizer provides switches for controlling certain circuits of the device. The Figs. 2 and 4 clearly illustrate these switches. A plurality of insulating collars 130, 131, 132 and 133 form an insulating post held upon the synchronizer lid 101 by a screw 134. This post supports a plurality of resilient contact blades, the one designated by the numeral 135 being supported between the insulating collars 132 and 133 and the plate 136 being supported between collars 132 and 131 and the plate 137 between collars 131 and 130. Blade 135 carries a contact 138 adapted normally to engage a contact 139 carried by blade 136 which also supports an insulating bumper on each side thereof adjacent its ends, one designated by the numeral 140 interposed between the blade 136 and the rotatable disc 120, the other 141 on the opposite side of blade 136 and adapted to be moved into engagement with blade 137 to move it after blade 136 has been flexed by the movement of disc 120 engaging bumper 140 and moving blade 136 a predetermined distance. Another insulating post is carried by the lid 101, this post comprising insulating collars 145, 146, 147 and 148 held on the lid by screw 149. A spring blade 150 is held between collars 148 and 147, a blade 151 between collars 147 and 146 and a blade 152 between collars 146 and 145. Blade 150 has a contact 153 engaging contact 154 on blade 137. Blade 151 carries a contact 155 normally engaging contact 156 carried by blade 152. An insulating block 157 at the end of blade 152 normally rests upon the contact blade 137. These contact blades are so arranged that in response to movement of the disc 108 longitudinally of shaft 104 it will engage bumper 140, continued longitudinal movement of the disc 108 relatively to the shaft 104 moving contact blade 136 to separate contacts 138 and 139. If the longitudinal movement of disc 108 relatively to the shaft 104 continues, the movement of blade 136 upwardly by said disc 108 will cause the bumper 141 thereon to engage contact blade 137, moving it to separate its contact 154 from the contact 153 on blade 150. Concurrently with the separation of contacts 153 and 154 by movement of blade 137, abutment block 157 will move contact blade 152 to separate its contact 156 from engagement with contact 155 on blade 151.

Two insulating posts are supported on the bottom wall of the synchronizer housing 100. One of these posts comprises insulating collars 160, 161, 162 and 163 secured to the housing by screw 164. A contact blade 165 is supported between insulating collars 163 and 162. Another contact blade 166 is supported between collars 162 and 161 and a third contact blade 167 is supported between collars 161 and 160. Blade 165 has a contact 168 at its free end normally engaging contact 169 on blade 166. Blade 166 carries an insulating bumper element 170 at its end, engageable by the disc 110 when it moves longitudinally relatively to the shaft 104.

The other insulating post comprises insulating collars 175, 176, 177 and 178 held in stacked relation on the bottom of the synchronizer housing by screw 179. Contact blade 180 is supported between insulating collars 175 and 176. Blade 181 is supported between collars 176 and 177. Blade 182 is supported between collars 177 and 178. Blade 179 has a contact 183 normally engaging contact 184 carried at the end of blade 167. Blade 181 carries a contact 185 at its free end normally engaging contact 186 on blade 182. An abutment insulating block 187 is interposed between the free end of contact blade 182 and blade 167. As the disc 110 moves downwardly longitudinally of shaft 104 it first engages abutment block 170, separating contacts 168 and 169. Continued movement of the disc 110 relatively to the shaft 104 in this direction causes abutment block 188, on the side of contact blade 166 opposite the abutment block 170, to engage blade 167, moving it to separate contacts 183 and 184 and at the same time moving contact blade 182 by the abutment block 187 to separate contacts 185 and 186.

In the installation of the device of the present invention various electrical devices are provided in the circuits to effect control of the electric motors. Among these devices are two electromagnetic actuated contactors designated as a whole by the numerals 50 and 250. The contactor 50 controls the circuits of the two motors for operating them in a direction so that the screw shaft rotates to move the nut downwardly thereon. The contactor 250 controls the circuits of the motors, operating their respective screw shafts so that the nuts thereon move upwardly or in a direction toward the motors themselves. Inasmuch as both of these contactors are identical, only one will be described detailedly.

Referring to the contactor 50 it is shown comprising a solenoid magnet having a core 51 which carries two bridging elements 52 and 53. An electromagnet winding 54 surrounds the core 51 so that when energized it may actuate the core to move the bridging contacts into circuit closing position. Bridging contact 52 moves into engagement with terminals 55 and 56 and bridging contact 53 is moved into engagement with terminals 57 and 58.

The source of electric power for operating the device of the present invention is a storage battery 500. A master switch 260 may be actuated to bridge contacts 261 and 262 to connect the battery with a selector switch comprising an operating contactor 263 adapted to be moved into engagement with the down terminal 264 or with the up terminal 265. The movable contact member of this selector switch is normally held in neutral position between the two terminals 264 and 265. A holding magnet 266 is provided which may be electrically energized to hold the movable contact member 263 in the "down" circuit closing position as long as the circuit is maintained through the holding magnet 266 to energize it. A similar holding magnet 267 is provided on the opposite side of the selector switch to hold movable contactor 263 in the "up" circuit closing position as long as the electromagnet holding magnet 267 is maintained energized.

The means for controlling the speed of the respective electric motors, more specifically the means for reducing the speed of each electric motor comprises a resistance, the one in circuit with the motors when they operate in the direction causing downward movement of their respective nuts being designated by the numeral 270. The resistance unit 271 may be introduced in circuit with one or the other electric motor to control speed when the motors are operating in a direction to move their respective nuts upwardly.

Each motor 25 and 225 is adapted to drive a timer mechanism for controlling the operation of their respective impulses 122 and 124 in accordance with the operation of the respective motor. The numeral 75 designates the timer operated by the motor 25, this timer being an electric switch or contactor adapted to be operated to open and close circuits at recurrent equal intervals. A cam 76 on the screw shaft has equally spaced lobes which engage a movable part of the switch at recurrent intervals to actuate it to open and close the timer switch 75. A similar timer switch 275 is opened and closed at equal intervals by a cam 276 on the screw shaft 226 driven by the electric motor 225. Timer switch 75 controls the energization of the impulser 122 so that it drives the rotatable disc 108 of the synchronizer in accordance with the speed of the electric motor 25. The timer switch 275 controls the energization of the impulser 124 so that it drives the disc 110 in accordance with the operating speed of the electric motor 225.

Any type of limit switches may be applied which are effective to stop operation of the respective motors when their driven nuts reach extreme positions at either end of their respective screw shafts. Such limit switches are diagrammatically shown in the Fig. 6. The limit switch which controls the operation of the electric motor 25 so that, it will stop when the nut 30 reaches its uppermost position, comprises contacts 78 and 79 normally engaged but separable by the nut 30 when it reaches its uppermost position. A similar switch comprises contacts 80 and 81 normally engaged is actuated by the nut 30 to separate said contacts when the nut reaches its lowermost position in the screw shaft 26. The opening of either one of the sets of contacts 78—79 or 80—81 breaks the electric circuit through the magnet winding 54 of the contactor 50. Similar limit switches are provided in connection with the nut 230 driven by the electric motor 225. The switch comprising contacts 278 and 279 is engageable by the nut 230 when it reaches its uppermost position to break engagement of said contacts and open the circuit through the winding 254 of the contactor 250. This circuit may also be broken by separation of the contacts 280 and 281 by nut 230 when it reaches its lowermost position on the screw shaft 226. Contacts 78—79 are connected in series with contacts 278—279, and 80—81 in series with contacts 280—281.

The electric motor 25 has two field windings, the one designated by the numeral 85 which when energized causes the motor 25 to rotate the screw shaft 26 so that the nut 30 thereon moves downwardly. The other winding 86 of this motor causes the motor to operate in the opposite direction when energized, resulting in an upward movement of the nut 30 on the screw shaft 26. Correspondingly motor 225 has a field 285 which when energized causes the motor 225 to rotate shaft 226 to move nut 230 downwardly while the field 286 causes a reverse rotation of the motor 225 whereby the screw shaft 226 is rotated to move the nut 230 thereon upwardly.

As has been mentioned before, each electric motor is normally disconnected from the speed reducing gearing through which it rotates its respective screw shaft. Each electric motor is provided with an electromagnetic clutch having a movable armature member normally engaging a brake ring to hold the respective screw shaft against rotation normally. When the respective electric motor is energized, its electromagnetic clutch is likewise energized so that the movable armature member thereof is withdrawn from frictional engagement with its respective brake ring and movable into gripping engagement with the motor driven disc. The electromagnetic clutch of the motor 25 comprises a winding 90 which when energized attracts the movable armature portion 91 of the clutch into engagement with the driven disc 92 of the motor. The motor 225 has an electromagnetic clutch comprising a winding 290 which when energized attracts the movable armature member 291 of the clutch to move it out of engagement with the braking ring 229 and into gripping engagement with the motor driven disc 292. The speed reducing gearing of motor 25 is designated by the numeral 28, and the speed reducing gearing of the motor 225 is designated by the numeral 228.

The operation of the device of the present invention will now be described. If the pilot of the plane equipped with the present invention wishes to land his craft, and in landing wishes to apply braking means to reduce its speed, the wing flaps 22 will be lowered to provide impedance to air flow past the wings and thereby reduce the speed of the vehicle. The preliminary operation requires the closing of the master switch 260 to bridge contacts 261—262 and connect the storage battery 500 with the selector switch contact 263.

To lower the wing flaps 22 the pilot actuates the movable contact 263 of the selector switch counterclockwise out of its neutral position so as to engage the terminal 264 of the selector switch. Now the following circuit will be established:

From the battery across terminals 261 and 262 of switch 260, through the movable contact 263 of the selector switch to terminal 264 thence to the holding magnet 266 through wire 300 to the switch blade 137 of the synchronizer across contacts 154 and 153 through the blade 150, wire 301 to blade 182 across contacts 186 and 185, blade 181 back to the storage battery via the ground connections. Now the holding magnet 266 is energized and as long as this circuit is maintained the movable contact 263 of the selector switch will be held in this circuit closing position.

As soon as the terminal 264 is engaged by the selector switch, current will flow from battery through the contact 263 and terminal 264 into and through wire 302 through the magnet winding 54 of the contactor 50, wire 303 across the contacts 80 and 81 of the down limit switch of the motor 25 thence through wire 304 across contacts 281 and 280 of the down limit switch of the motor 225 and back to the source of electric power or storage battery 500 via the ground connection. Energization of the magnet winding 54 will cause attraction of the core 51, moving it so as to bring the bridging members 52 and 53 thereof into engagement with their respective terminals of the contactor. Now the following circuit from the storage battery is completed: from the battery to the junction point 305, thence through the wire 306 to the junction point 307 thence through the short circuiting path including wire 308, synchronizer contact blade 136, contacts 139 and 138, blade 135 thence through wire 309 to the terminal 55 of the contactor across the bridging member 52 to terminal 56 thence through wire 310, field winding 85 through wire 311 across the armature of motor 25 through a temperature responsive protective device 312 back to the battery via ground connections. The wire 311 also connects with the magnet winding 90 of the electromagnetic clutch which is also connected with the protective device 312 so as to lead to ground therethrough. Another wire 314 leads from the junction point 305 to the contact blade 165 of the synchronizer and current flow therethrough will pass through the engaging contacts 168 and 169 through blade 166, wire 315 to the junction point 316 thence through wire 317 to the stationary terminal 58 of the contactor 50 across the bridging element 53 to terminal 57 thence through wire 318 to the field 285 of the motor 225 thence through wire 319 through the armature of the motor 225 and protective device 320 to ground and also through the magnet winding 290 of the electromagnetic clutch through the protective device 320 to ground.

With these circuits completed and current flowing through both fields 85 and 285 of the electric motors 25 and 225 respectively and also through the magnet windings 90 and 290 of their respective electromagnetic clutches, the motors 225 will operate to turn their respective screw shafts 26 and 226 in a direction in which their respective nuts 30 and 230 will be moved downwardly or toward the free end of said screw shafts. As these nuts 30 and 230 move in this direction their connections with the respective wing flaps, the one shown being designated by the numeral 35 for the link and 22 for the flap, will cause said flaps to be moved downwardly or clockwise for air brake purposes.

Current flowing through the wire 306 will also flow from the junction 320 through wire 321, magnet winding of the pulsator 124 through wire 322 down to and across the timer switch 275 back through ground connection to the battery 500. Current will also flow from the junction point 323 in wire 314 through wire 324, magnet winding of the impulser 122 thence through wire 325 to and across the timer switch 75 and back to the battery via ground connections.

It has previously been stated that timer switches 75 and 275 are driven by cams 76 and 276 on the shafts 26 and 226 of the motors 25 and 225 respectively. These timer switches are operated to open and close their respective circuits at equal intervals in recurrent sequence. Thus when the motor 25 rotates screw shaft 26, switch 75 will repeatedly close and open the circuit through the impulser 123 at equal intervals, attracting and releasing its actuating member 123 at such equal intervals. The operation of the actuator 123 of impulser 122 will thus move the rotatable disc 108 through the distance of one tooth or ratchet as provided thereon, each time the impulser is energized and deenergized. Thus it may be seen that this disc 108 will be rotated in accordance with the operating speed of the motor 25. Likewise timer switch 275 closing and opening its circuit at equal recurrent intervals in accordance with the speed of the electric motor 225 will cause energization and deenergization of the magnet winding of the impulser 124, thus each time the impulser 124 is deenergized, its actuator 125 is moved inwardly to move it back into engagement with the next adjacent following tooth and when the impulser is energized its actuator 125 will be moved outwardly to rotate the disc 110 through a distance equal to the space of a ratchet tooth thereon. Consequently disc 110 is rotated in accordance with the speed at which the electric motor 225 is operating.

As long as the motors 25 and 225 rotate at substantially the same speed, their timer switches 75 and 275 respectively will cause impulsers 122 and 124 to operate in synchronism and therefore these impulsers will rotate their respective discs 108 and 110 at substantially the same speed. While these discs 108 and 110 are rotating at substantially the same speed, their extending portions 109 and 111 respectively, seating in the respective recesses 109 and 107 of the disc cam, will cause said disc cam 105 to rotate with both discs 108 and 110. While discs 108 and 110 are rotating in unison with the cam disc 105, the synchronizer may be said to be operating idly and no control is effected thereby. However, should the one motor operate at a faster rotating speed than the other, then this synchronous or idle movement of the synchronizer is upset and controlling efforts will be instituted. For instance, if the electric motor 25 operates at a greater rotating speed than the electric motor 225, the timer switch 75 actuated by the motor will make and break its circuit at a greater speed than the timer 275 driven by the electric motor 225 now operating at lesser speed than the motor 25. As a consequence the impulser 122 will be more rapidly energized and deenergized than the impulser 124 and therefore disc 108 will be rotated at a greater speed than the disc 110 rotating in accordance with the rotating speed of its associated motor 225. As the disc 108 rotates faster than the disc 110 or the cam 105 whose rotating speed is controlled by the rotation of the slower rotating disc, the sloping surface of the extensions 109 on disc 108 will start to move relatively to the sloping bottom surface of the recess 106 occupied by said extensions and therefore as disc 108 rotates counterclockwise as regards Fig. 2 it will also move upwardly longitudinally of the shaft 104 or more specifically away from the cam disc 105. In response to this longitudinal movement of disc 108 the abutment insulating block 140 is engaged and contact blade 136 is moved upwardly to separate the contacts 138 and 139. With the breaking of these contacts the short circuit around the resistance unit 270, which short circuit includes the wire 308, contact blade 136, contacts 139 and 138 and blade 135 is opened and therefore the main current flow to the field 85 of motor 25 has the resistance unit 270 inserted therein. With the introduction of this resistance unit 270 into the motor field circuit the motor speed will be reduced so that eventually it will operate at substantially the same speed as the other electric motor 225.

If the introduction of the resistance unit 270 in the field circuit of motor 225 does not eventually equalize operation between the two motors, or more specifically, if the motor 225 still tends to lag behind the operation of motor 25, then the disc 108 is still rotated ahead of disc 110 and continued longitudinal movement of the disc 108 relatively to the shaft 104 will obtain. At a predetermined point in this continued longitudinal movement of disc 108 the abutment block 141 on contact blade 136 will engage contact blade 137 and move it upwardly, first to break engagement between contacts 153 and 154 and at the same time move contact blade 152 through the abutment block 157 to separate contacts 155 and 156. Separation of contacts 153 and 154 breaks the circuit established through the holding magnet 266, causing its deenergization, at which time the movable contactor arm 263 of the selector switch is released and automatically returned to neutral position. This breaks the circuit to the magnet winding 54 of the controller 50, deenergizing it and permitting its return to normal position in which the bridging elements 52 and 53 are moved out of contact with their respective terminals 55—56 and 57—58. As a result of the movement of the bridging members 52—53 out of engagement with their terminals the motor circuits through fields 85 and 285 are discontinued and motor operation will cease.

Now for instance if the motor 225 rotates at a greater rate than motor 25, then its timer 275 will cause operation of its respective impulser 124 to turn the disc 110 ahead of disc 108. In response to the faster rotation of disc 110, its extensions 111 acting on the cam 105 will cause longitudinal movement of disc 110 relatively to the shaft 104 against the effect of spring 115 and consequently the abutment block 170 will be engaged to move contact blade 166 and break contacts 168 and 169.

Separation of contacts 168, 169 destroys the short circuit around the regulating resistance 271 and therefore introduces it into the circuit of the motor field 285, reducing the speed of operation of motor 225. If the resistance 271 is not effective to establish synchronous motor operation and if unequal motor operation persists, then the disc 110 will continue in its longitudinal movement due to its being driven at a faster rate than disc 108 and at a predetermined point an abutment block 188 on blade 166 will engage blade 167 to separate contacts 183 and 184 and also to separate contacts 185 and 186 by shifting of the contact blade 182. Separating contacts 185 and 186 breaks the circuit through the holding coil 266 and causes its deenergization. It will be seen that contacts 185 and 186 are in series with the contacts 153 and 154 which are connected by wire 300 to the holding coil 266. Deenergization of electromagnet holding coil 266 by breaking of contacts 185 and 186 will have the same effect as before, that is it releases the movable contact arm 263 of the selector switch to move to neutral position where the terminal 264 is no longer engaged and thus the circuit through the magnet winding 54 of the contactor 50 is broken, thereby permitting the contactor to open the motor circuits and terminate motor operation.

The above description has been directed to the operation of the motors in a direction in which their respective screw shafts rotate to move the nuts downwardly. When the pilot wishes to move the wing flaps upwardly, he actuates the movable contactor arm 263 of the selector switch clockwise to engage terminal 265 whereby to establish a circuit through the holding coil magnet 267 and through the contactor 250. As soon as the contactor 250 is energized so that its winding 254 attracts the core 251 to cause bridging elements 252—253 to engage their respective stationary terminals 255—256 and 257—258 respectively the following motor circuits are established:

From the storage battery 500 to the junction point 305 through wire 306 to junction point 307, wire 308, across contacts 139—138, wire 309 to the junction point 313, thence through wire 350 to the stationary terminal 256 of the contactor 250 across bridging element 251 to terminal 255, wire 351 through the winding 86 of the motor 25 thence through the motor armature and the winding 90 of the electromagnetic clutch to ground whereby motor 25 operates in a direction to rotate its screwshaft 26 so that the nut 30 will move upwardly thereon toward the motor. Current will also flow from the junction point 305 through wire 314 across contacts 168—169, wire 315 to junction point 316 thence through wire 354, terminal 258, element 253, terminal 257 down through the winding 286 of motor 225 thence through the motor armature and also the magnetic clutch winding 290 back to the battery via ground. Energization of field 296 will cause the motor 225 to rotate so that its screw shaft 226 is turned, causing the nut 230 thereon to move upwardly toward the motor. The direction of rotation of the motor 25 and 225 does not alter the effect of the timer switches 75 and 275 respectively or the synchronizer. If when rotating in the direction just described the motor 25 operates at an excessive speed, the synchronous disc 108 will be operated to introduce the regulator resistance 270 into its circuit. If on the other hand the motor 225 operates faster than the motor 25, the timer switch 275 and impulser 124 will effect rotation of the synchronous disc 110 ahead of the disc 108 whereby longitudinal movement of the synchronous disc 110 is effected and the regulating resistance 271 is introduced into the circuit of the motor 225 to reduce its speed. The synchronizer will also act to stop operation of both motors if either one of them persist in continued movement ahead of the other.

Limit switches are provided on each motor for limiting the extreme movement of the nuts actuated thereby. On motor 25 the limit switch comprises contacts 78 and 79 and on motor 225 the limit switch comprises contacts 278—279. These switches are connected in series with each other and with the magnet winding 254 of the contactor 250 so that when the nuts reach their extreme upper position these limit switches are opened to break the circuit through the winding 254 of the contactor 250, thus causing its deenergization and effecting the breaking of the motor circuit. Likewise limit switches including contacts 80 and 81 adjacent nut 30 of motor 25 and a limit switch including contacts 280 and 281 engageable by the nut 230 actuated by motor 225 are adapted to be opened when the respective nuts reach their lowermost position. When these two limit switches are opened they, being in circuit with the magnet winding 54 of the contactor 50 will break this circuit, causing deenergization of this contactor and causing it to break both motor circuits and stop motor operation.

From the aforegoing it may clearly be seen that applicant has provided a control device for two electric motors adapted to operate concurrently, said control functioning substantially to maintain synchronous operation of the motors. The control device is further adapted to discontinue motor operation if for any reason one motor persists in lagging behind or one motor persists in running faster than the other motor, thereby avoiding any damage which might occur if the condition causing unequal motor operation is permitted to continue.

While the embodiment of the present invention constitutes a preferred form, it is to be understood that other forms might be adopted, all coming within the scope of the claims which follow.

What is claimed is as follows:

1. In a control device for a plurality of electric motors adapted to operate concurrently, the combination with a source of power, of a switch for simultaneously connecting all of the motors with the source of power; separate, normally ineffective speed controlling means for each motor; a unitary synchronizer comprising a plurality of cooperating elements each one of which is operated in accordance with the speed of a respective motor, each element being adapted to render a speed controlling means effective in response to rotation of the associated motor in excess of the speed of another motor; and an impulser controlled by each motor to effect operation of the synchronizer elements in accordance with the speed of the respective motor.

2. In a control device for a plurality of electric motors, the combination with a source of electric power; means for simultaneously connecting all of the motors with the power source for concurrent operation of all of the motors; normally ineffective speed controlling means for each electric motor; a synchronizer comprising separate relatively rotatable members, each adapted to be rotated in one direction in accordance with the rotating speed of a respective electric motor, said synchronizer comprising also an element adapted to shift either one of said members to render a speed controlling means effective to control the speed of the electric motor associated therewith when said one member rotates at a faster rate than the other; and means for rotating said synchronizer members in accordance with the speed of a respective electric motor.

3. In a control device for a plurality of electric motors adapted to operate concurrently, the combination with a source of power, of a switch for simultaneously connecting all of the motors with the source of power; a normally ineffective speed regulating winding adapted to be connected in the circuit of each electric motor; a synchronizer normally ineffective but adapted, in response to unequal speeds of the respective electric motors, to control the speed of the fastest operating motor by rendering effective the speed regulating winding connected therewith; and means controlled by each electric motor for effecting operation of the synchronizer in accordance with the speed of the respective motor driving said means.

4. In a control device for a plurality of electric motors adapted to operate concurrently, the combination with a source of power, of a switch for simultaneously connecting all of the motors with the source of power; a normally short circuited resistance winding in circuit with each electric motor; a synchronizer ineffective while all of the electric motors are operating at substantially the same speed, said synchronizer being adapted to break the short circuit about a resistance winding and render it effective to retard the speed of the motor connected therewith in response to speeds thereof in excess of the other motors; and means controlled by each electric motor for effecting operation of the synchronizer in accordance with the speed of the respective electric motor operating said means.

5. In a control device for a plurality of electric motors adapted to operate concurrently, the combination with a source of power; of a switch for simultaneously connecting all of the motors with the source of power; a separate, normally short circuited resistance winding in circuit with each electric motor; a synchronizer operating idly while all of the electric motors are operating in substantial synchronism, said synchronizer being adapted to operate effectually to render one of the resistance windings effective to reduce the speed of the particular motor connected thereto in response to increase in operating speed of said particular motor over the other motors; electromagnetic means for actuating the synchronizer; and a timer switch operated at regular intervals by said electric motor, each timer switch controlling the energization of an electromagnetic means in accordance with the speed of the respective motor.

6. In a control device for a plurality of electric motors adapted to operate concurrently, the combination with a source of power, of a switch for simultaneously connecting all of the motors with the source of power; a normally inactive speed regulating device for each electric motor; a controller for each of said speed regulating devices; means for operating each controller in accordance with the speed of a respective electric motor; and means engaging all of said controllers, adapted to maintain said controllers ineffective to render their respective speed regulating devices active while said controllers are operating in unison, but adapted to render a speed regulating device active to retard the operating speed of its motor in response to unequal rotation of the electric motors.

7. In a control device for two concurrently operating electric motors, the combination with a source of electric power; of a switch for simultaneously connecting both motors with the power source; normally inactive speed controlling means for each motor; a synchronizer comprising two rotatable discs each adapted to be shifted to render a speed controlling device active; a device interposed between said discs, normally having no effect upon said disc, but adapted to shift one disc to render its speed controlling device active when said one disc is rotated at a greater speed than the other; and means under the control of each electric motor for rotating a respective disc in accordance with the operating speed of the controlling motor.

8. In a control device for two concurrently operating electric motors, the combination with a source of electric power; of a switch for simultaneously connecting both motors with the power source; normally inactive speed controlling means for each motor; a synchronizer comprising two rotatable discs adapted to be shifted axially to render one or the other speed controlling device active; a camming device interposed between and engaging said discs and adapted to act as a disc shifting device only in response to the rotation of one disc at a greater speed than the other; separate means for imparting rotative impulses to each disc in recurrent sequence; and means operated at equal intervals by each motor for effecting energization of the respective impulse imparting means.

9. In a control device for two concurrently operating electric motors, the combination with a source of electric power; of a switch for simultaneously connecting both motors with the power source; normally inactive speed controlling means for each motor; a synchronizer comprising two rotatable discs adapted to be shifted axially to render one or the other speed controlling device active; a camming device interposed between and engaging said discs and normally ineffective to shift either disc axially while said discs are rotating in unison, but adapted to shift a disc axially when it rotates at a greater rate than the other; an electromagnetic actuator for rotating each disc; and means actuated by each motor to effect operation of a respective electromagnetic actuator in accordance with the rotating speed of the driving motor.

10. In a control device for two electric motors, the combination with a source of electric power; of a switch for simultaneously connecting both motors with the source of power for concurrent operation of said motors; a resistance element in circuit with each electric motor for reducing the maximum operating speed; means for short circuiting each resistance element normally to render it ineffective; a synchronizer comprising two rotatable discs each capable of axial movement to open a short circuit means; a camming device interposed between said discs and engaged thereby and rotatable therewith; a spring for urging each disc into engagement with the camming device; means for rotating each disc; and means actuated by each motor for effecting rotation of a disc in accordance with the speed of the respective electric motor, the camming device becoming effective to move one disc axially to engage and break the resistance element short circuit of the respective motor which is rotating said one disc at a greater speed than the other disc is being rotated by its motor.

11. In a control device for two electric motors, the combination with a source of electric power; of a switch for simultaneously connecting both motors with the source of power for concurrent operation of said motors; a resistance element in circuit with each electric motor for reducing its maximum operating speed; means for short circuiting each resistance element normally to render it ineffective; a synchronizer comprising a shifter cam; two ratchet wheels, each yieldably urged upon one side of the cam, said ratchet wheels when rotating in unison, turning the cam therewith, however, when one ratchet wheel rotates faster than the other, said cam will move said faster rotating wheel axially to engage and open a resistance short circuiting means rendering it effective to reduce the operating speed of the motor connected therewith; an electromagnetically operated ratchet exerting repeated turning impulses upon a ratchet wheel at equal intervals; and a timer switch actuated by each electric motor for recurrently connecting a respective ratchet magnet with the source of electric power.

12. In a control device for two electric motors, the combination with a source of electric power; of a switch for simultaneously connecting both motors with the source of power for concurrent operation; electromagnetic holding means rendered effective to hold said switch in circuit closing position when said switch is closed; a speed reducing resistance connected in series with each motor; means normally short circuiting each resistance to render it ineffective; a synchronizer comprising a cam; two rotatable discs yieldably urged upon said intermediate cam adapted to shift one or the other disc axially only when said discs are not rotating in unison whereby said axially moving disc engages and breaks the short circuiting means of an electric motor; two normally closed means in circuit with the said holding means, each adapted to be actuated by a respective synchronizer disc to deenergize the holding means and effect its release of the switch whereby the motor circuits are discontinued when said synchronizer disc is moved axially into a predetermined position; means for rotating said synchronizer discs, each in accordance with a respective electric motor.

13. In a control device for two electric motors, the combination with a source of electric power; of an electromagnetic controller switch adapted to be actuated, simultaneously to connect both motors with the source of power; a hand switch for connecting the electromagnet switch with the source of power to energize it for closing the motor circuits; a holding magnet rendered effective to hold the hand switch in operated position by the closing of said hand switch; a speed reducing resistance in each motor circuit; means normally rendering each resistance ineffective; a synchronizer having separate parts each operated under the control of and in accordance with the speed of a respective electric motor, said parts operating idly when acting in unison in response to equal rotating speeds of the respective motors but adapted to be shifted axially to render one or the other speed reducing resistances effective when one of the motors rotates at a greater speed than the other, whereby the faster operating motor is retarded; means for rotating said synchronizer parts; and circuit controlling means connected in series with the holding magnet, each adapted to be actuated by a respective synchronizer part to open its circuit and release the hand switch for deenergizing the controller switch and break both motor circuits when said synchronizer part has been shifted axially to a predetermined position by continued unequal rotation of the electric motors.

14. In a control device for a plurality of reversible electric motors, the combination with a source of electric power, controllers for simultaneously connecting all motors to the source of power, one controller for concurrent operation of the motor in one direction, the other for concurrent motor operation in the opposite direction; means normally ineffective but adapted to be rendered effective to reduce the speed of each electric motor in either direction; a synchronizer having separate, relatively rotatable members each adapted to be rotated in one direction in accordance with the rotating speed of an electric motor in either direction; means actuated by one of said members when it is rotating faster than the other member for rendering effective the speed reducing means of the electric motor with which said faster rotating member is synchronized; and means for rotating each synchronizer member in accordance with the speed of a respective motor.

15. A device in accordance with claim 14 in which, however, circuit controlling means are provided, adapted to be actuated by either member of the synchronizer when one of said members is rotated predeterminately ahead of the other member for disconnecting all of the electric motors from the source of power.

16. In a control device for two electric motors adapted to be connected to a source of electric power for concurrent operation; means adapted concurrently to connect said two motors with the power source; speed governing means for each electric motor; a synchronizer having moving parts, ineffective when moving in synchronism, but effective to render one or the other speed governing means effective in response to unsynchronized movement of said parts; impulsers for each of said synchronizer moving parts, adapted to provide equally timed, recurrent moving impulses to a synchronizer part; and a timer actuated by each electric motor, each adapted to render an impulser effective to deliver its impulses to its respective synchronizer part in accordance with the rotating speed of its driving motor.

CHARLES D. DAVIDSON.

REFERENCES CITED

The following references are of record in the file of this patent:

UNITED STATES PATENTS

| Number | Name | Date |
|---|---|---|
| 1,605,051 | Menzies | Nov. 2, 1926 |